United States Patent [19]

Kimura et al.

[11] Patent Number: 5,069,746

[45] Date of Patent: Dec. 3, 1991

[54] METHOD FOR MANUFACTURING A FILM CAPACITOR

[75] Inventors: Tadashi Kimura, Kobe; Tanejiro Ikeda, Nara, both of Japan

[73] Assignee: Matsushita Electric Industrial Co., Ltd., Kadoma, Japan

[21] Appl. No.: 476,054

[22] Filed: Feb. 7, 1990

[30] Foreign Application Priority Data

Feb. 7, 1989 [JP] Japan .................................. 1-28174

[51] Int. Cl.$^5$ ............................................. H01L 21/00
[52] U.S. Cl. .................................... 156/633; 156/643; 156/646; 156/651; 156/656; 156/668; 29/25.42
[58] Field of Search ............... 156/643, 626, 627, 668, 156/651, 633, 656, 646; 29/25.42

[56] References Cited

U.S. PATENT DOCUMENTS

| | | | |
|---|---|---|---|
| 4,102,021 | 7/1978 | Ham et al. | 29/25.42 |
| 4,115,184 | 9/1978 | Poulsen | 156/626 |
| 4,263,088 | 4/1981 | Gorin | 156/626 |
| 4,613,518 | 9/1986 | Nakao et al. | 156/633 X |
| 4,861,424 | 8/1989 | Fujimura et al. | 156/668 X |

FOREIGN PATENT DOCUMENTS 0158971 10/1985 European Pat. Off. .
2645129 4/1977 Fed. Rep. of Germany .

Primary Examiner—David A. Simmons
Assistant Examiner—Thi Dang
Attorney, Agent, or Firm—Cushman, Darby & Cushman

[57] ABSTRACT

In manufacturing a film capacitor, an etching of laminated or stacked film capacitor body for making electrode connection is made by a two-stage application of radio frequency power, wherein a first stage application is at a larger power and a second stage application is at a smaller power of the radio frequency.

4 Claims, 5 Drawing Sheets

FIG.1a
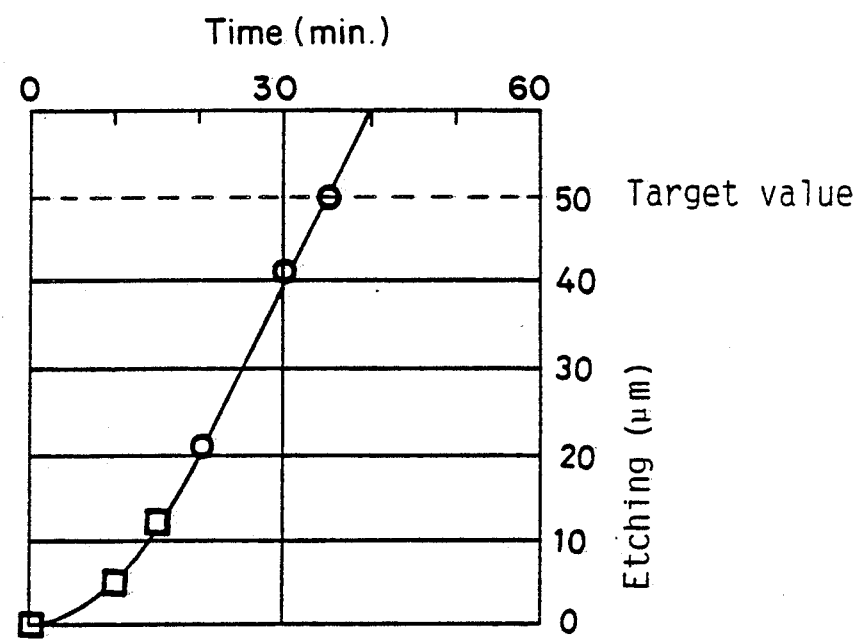
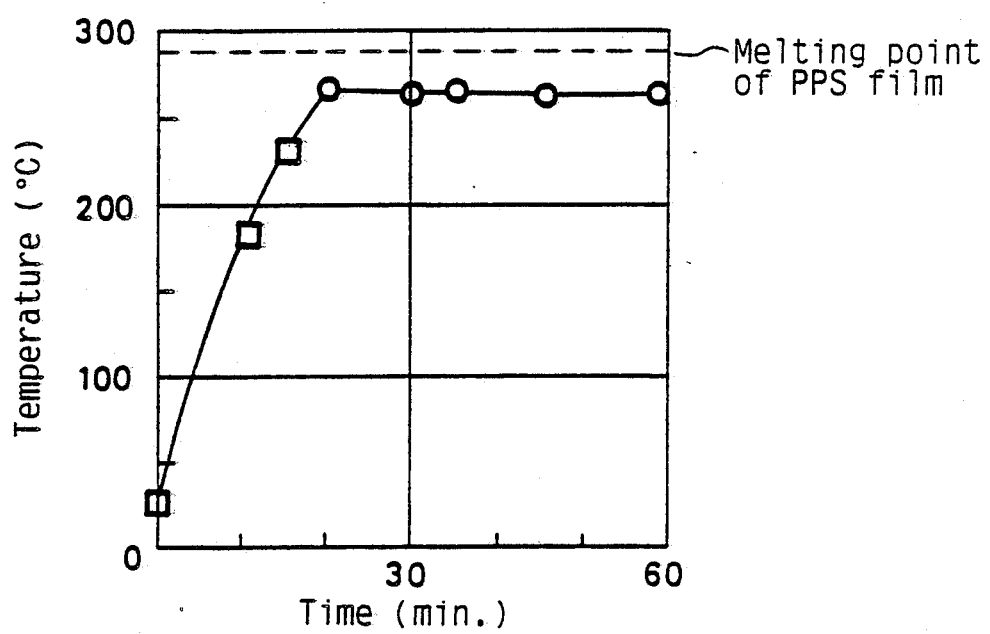
FIG. 1b

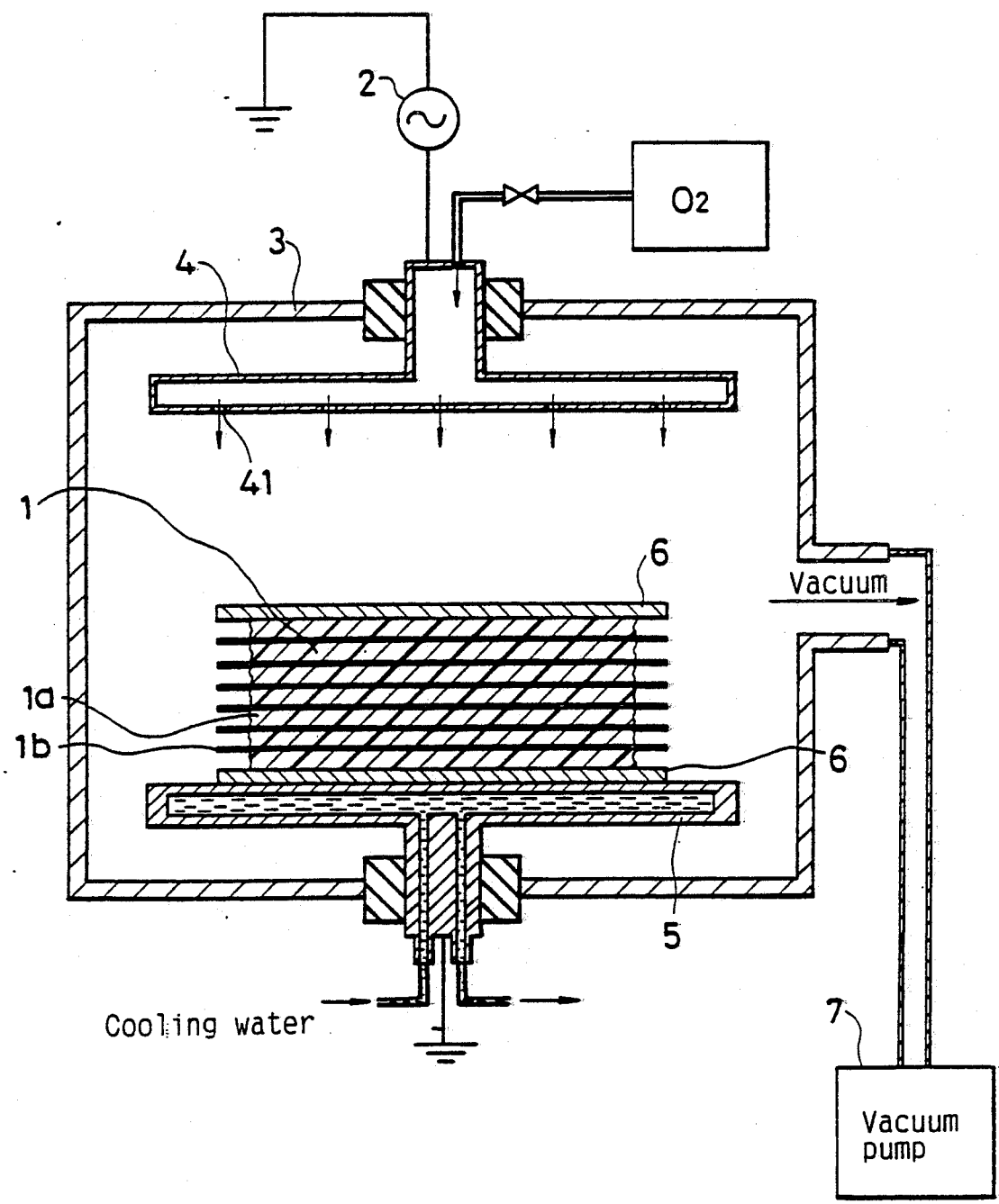

METHOD FOR MANUFACTURING A FILM CAPACITOR

FIELD OF THE INVENTION AND RELATED ART STATEMENT

1. Field of the Invention

The present invention relates to a method for manufacturing a film capacitor, and particularly to a method for manufacturing a film capacitor having a lamination, or a stacked body, of organic dielectric films having electrode layers thereon.

2. Description of the Related Art

Recently, decrease in size, weight, and cost, as well as the achievement of high performance, demanded generally for electronics components in general, and hence, for film capacitors. That is, film capacitors of small size and high characteristic performance are being developed extensively.

The inventors have conducted research for manufacturing film capacitor elements such as a stacked body or a lamination, whereof selective removal of organic dielectric substance is made at the electrode connection. The art which was not disclosed to public, but was under research as prior stage to conceiving the present invention is elucidated with reference to FIG. 2 and FIG. 3, for the sake of easy understanding of the present invention.

FIG. 3 shows an oxygen plasma processing apparatus and a state of manufacturing a film capacitor body by selective removal of the organic dielectric film in the stacked body or the lamination, for making an electrode connecting part. In FIG. 3, a film capacitor body 1 comprises a multiple layer lamination, stack or roll of plastic dielectric films, e.g. polyphenylenesulfide (hereinafter is referred to being abbreviated as PPS) films, 1a and aluminum films 1b vapor-deposited on the PPS films as electrodes, forming alternate lamination of the dielectric film and the electrodes, in a form of a laminated body or a stacked body or wound into a roll-shape. The film capacitor 1 is placed on a water-cooled table-shaped lower electrode 5 disposed in a vacuum chamber 3. The vacuum chamber 3 further comprises an upper electrode 4, which has gas discharging perforations 41 on its lower surface for discharging $O_2$ gas in a chamber on the film capacitor body 1. And the upper electrode 4 is applied with a radio frequency power of 13.56 MHz from a radio frequency power source 2. The film capacitor body 1 is sandwiched between a pair of mask members 6 which cover upper and lower end faces of the film capacitor body 1 so as to isolate them from the low temperature oxygen plasma during the oxygen plasma processing. The masks are made, for example, of aluminum sheets or the like. The vacuum chamber 3 is connected to a vacuum pump 7 for evacuating the air inside.

In the above-mentioned chamber, the $O_2$ plasma etching is made by discharging $O_2$ gas from the perforations 41 of the upper electrode 4 into the chamber and applying a radio frequency power from the upper electrode 4 and the lower electrode 5 to the $O_2$ gas in the chamber 3. Thus, the $O_2$ gas is excited to become oxygen plasma such that a reaction-active oxygen radicals against the organic film is produced in the oxygen plasma. And the exposed side surfaces of the laminated or stacked film capacitor body 1 is selectively etched and removed by contacting with the oxygen radicals, thereby causing the end portions of the vapor deposited aluminum electrodes 1b to protrude from the oxygen-plasma-etched side faces of the PPS film 1a.

Then, a known metalicon layer 8 is formed on the exposed protruding edges of aluminum electrodes so as to electrically connect the electrodes.

FIG. 2 is a graph of curves which shows the relationship between processing time (minutes) and amount (depth: $\mu m$) of the selective etching of PPS film at the side face, and also temperature rises for several radio frequency powers applied to the chamber. One example of other processing conditions were as follows:

size of process chamber:
diameter: 300 mm
height: 300 mm
size of PPS laminated capacitor bodies:
width: 3.3 mm
length: 3.8 mm
height (depth): 2.0 mm
oxygen flow rate: 30 sccm
pressure in the processing chamber: 0.5 Torr.
distance between the upper electrode 4 and the lower electrode 5: 50 mm
radio frequency power: 300 W, 500 W and 700 W
frequency of the radio frequency power: 13.56 MHz.

As shown in FIG. 2, it is observed that (1) the larger the applied radio frequency power, the faster the etching speed (etching depth: $\mu m$) of the PPS film 1a, and the higher the temperature becomes, (2) after a lapse of a predetermined time from an application of the radio frequency of a given intensity, the temperature becomes constant, (3) when the radio frequency power of 700 W or larger is used for etching 50 $\mu m$ depthwise of PPS film from the side face, the temperature of the whole body of the PPS film capacitor body 1 rises too high above the threshold melting temperature of PPS film; whereas when the radio frequency power is 500 W or lower for the same etching the temperature of the PPS film capacitor body 1 does not exceed the threshold temperature, and the intended 50 $\mu m$ depth etching of PPS film is made by processing for 45 minutes, and (4) when the radio frequency power is 300 W or lower, the processing time becomes 60 minutes or longer, which is too long.

That is, in the non-disclosed prior stage method of the radio frequency etching of the PPS film capacitor body, the safe processing time is 45 minutes or longer at the radio frequency power of 500 W.

In other words, when the applied radio frequency power is larger, the oxygen plasma density is raised, and generation of the oxygen radicals which react with the PPS film 1a increases, and the etching speed for the PPS film 1a is increased. On the other hand, an excessively large radio frequency power application will unduly raise the temperature of the PPS film 1a above the threshold temperature (melting point) of the PPS film 1a, thereby undesirably melting the PPS film 1a. Accordingly, the applied radio frequency power must be limited to a safe threshold value, and thereby the etching speed has not been sufficiently fast.

OBJECT AND SUMMARY OF THE INVENTION

The inventors considered the above-mentioned nature and conditions of the etching speed of the film capacitor body and the safe threshold power which does not melt the inside and whole part of the PPS film capacitor body, and summarized as follows:

(1) first, the non-disclosed prior stage application of the radio frequency power, which is lower than the safe threshold limit, results in insufficient production of the active radicals of oxygen which makes the reaction with the side surface of the film capacitor body of the PPS dielectric substance, resulting in an insufficiently low etching speed and an undesirably long processing time;

(2) generally, the higher the temperature in the process, the higher the etching speed of the organic substance, such as PPS; and (3) when a low and constant power is applied, the temperature rise rate is very small, and therefore the time increase rate of the etching speed is insufficiently small, resulting in an unduly long etching time of the side face of the PPS film capacitor body.

Considering the above, the inventors conceived the present invention which can shorten the processing time without desirably melting the inside or any part of the PPS film capacitor body.

The above-mentioned object of the present invention is achieved by a method for manufacturing a film capacitor comprising the steps of:

selectively etching side faces of a film capacitor body comprising a multiple layer lamination, stack or roll of plastic films and electrode layer, by contacting them with a reactive gas which is reactive to selected parts of the plastic films and thereafter forming connection metal members on the exposed edges of the electrode layers to make an edge terminal, wherein radio frequency powers for generating reactive gas and to heat the film capacitor body are applied to the reactive chamber in a two-stage process which comprises:

a first stage of applying a higher power, whereby a sufficient amount of the reactive gas is generated and temperature of the film capacity body is raised to a predetermined temperature which is close to, but below, a threshold melting temperature of the plastic film within a reasonable predetermined temperature, and a second stage, which is subsequent to the first stage, of applying a lower power, whereby the film capacity body having a raised temperature in the first stage is maintained around the predetermined temperature but below the threshold temperature.

By means of the above-mentioned method, much of the component which is reactive with the organic substance is produced in the oxygen plasma, and thereby etching speed is accelerated and the process time is shortened. Therefore, the temperature of the laminated or stacked film capacitor body is raised to the temperature which is appropriately close to the threshold temperature within a short time period. Then, by application of the weaker radio frequency power in the second stage process, the etching of the side face of the film capacitor body is carried out safely under the threshold temperature, but close thereto, without fear of an undesirable temperature rise above the threshold temperature. By adopting the above-mentioned two-staged process instead of the non-disclosed prior stage process of applying radio frequency power of constant magnitude in a single stage, process time period is shortened, without fear of damaging the film capacitor body.

BRIEF EXPLANATION OF THE DRAWINGS

FIG. 1 is a graph showing the relationships between processing time (minutes) and amount (depth: μm) of the selective etching of PPS film at the side face, as well as temperature rises for radio frequency powers applied to the chamber of the preferred embodiment made in accordance with the method of the present invention.

FIG. 3 is a sectional view showing a parallel type manufacturing apparatus which is common to the non-disclosed prior stage method and the embodiment.

It will be recognized that some or all of the Figures are schematic representations for purposes of illustration and do not necessarily depict the actual relative sizes or locations of the elements shown.

DETAILED DESCRIPTION OF THE EMBODIMENT

Figure 3A:
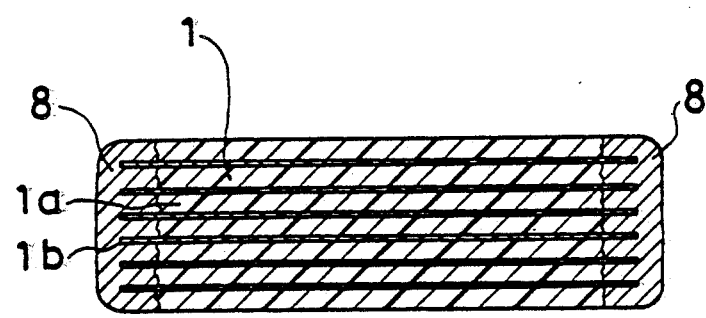
FIG. 3A is a sectional view showing the film capacitor body whereon metalicon layers are provided on its plasma-etched side part.

Hereafter the preferred embodiment is elucidated with reference to the accompanying drawings of FIG. 1 and FIG. 3.

FIG. 1 is a graph of curves which show relations between processing time (minutes) and amount (depth: μm) of the selective etching of a PPS film at the side face, also as well as temperature rises for several radio frequency powers applied to the chamber, with respect to the preferred embodiment made in accordance with the present invention. The manufacturing apparatus of FIG. 3 and variations of the below-mentioned two step application of the radio frequency power are also within the scope of the present invention.

An oxygen plasma processing apparatus as shown in FIG. 3 is used by combining a program of applying radio frequency power in a two stage manner. In FIG. 3, a film capacitor body 1 comprises a multiple layer lamination, stack or roll of plastic dielectric films, e.g. polyphenylenesulfide (hereinafter is referred to being abbreviated as PPS) films 1a, and aluminium films 1b vapor-deposited on the PPS films as electrodes, forming thus alternate lamination of the dielectric film and the electrodes, in a form of a laminated body or a stacked body or wound into a roll-shape. In actual processing, a number of the film capacitor bodies 1 are placed on a water-cooled table-shaped lower electrode 5 disposed in a vacuum chamber 3. The vacuum chamber 3 further comprises an upper electrode 4, which has gas discharging perforations 41 on its lower surface for discharging $O_2$ gas in a chamber on the film capacitor body 1. And the upper electrode 4 is applied with a radio frequency power from a radio frequency power source 2. The film capacitor body 1 is sandwiched between a pair of mask members 6 which covers upper and lower end faces of the film capacitor body 1 so as to isolate them from the low temperature oxygen plasma during the oxygen plasma processing. The masks are made, for example, with aluminum sheets or the like. The vacuum chamber 3 is connected to a vacuum pump 7 for evacuating the air inside thereof.

In the above-mentioned chamber 3, the $O_2$ plasma etching is made by discharging $O_2$ gas from the perforations 41 of the upper electrode 4 into the chamber 3, and a radio frequency power from the upper electrode 4 and the lower electrode 5, to the $O_2$ gas in the chamber 3 to excite the $O_2$ gas to become oxygen plasma, and to the film capacitor body 1 respectively. The exposed side surfaces of the laminated or stacked film capacitor body 1 are selectively etched and removed by contact with the oxygen plasma, thereby causing the end parts of the vapor deposited aluminum electrode 1b to protrude from the oxygen-plasma-etched side faces of the PPS film 1a. The difference of manufacturing process of the preferred embodiment from the afore-mentioned non-disclosed disclosed prior stage method is adoption of a two-stage application of radio frequency powers to the reaction chamber, in that a first stage is of larger radio frequency power intensity and a second stage is of smaller radio frequency power intensity.

Then, a known metalicon layers 8 are formed on the exposed protruding edges of aluminum electrodes so as to make to electrically connect to the electrodes.

Figures 2A, 2B:
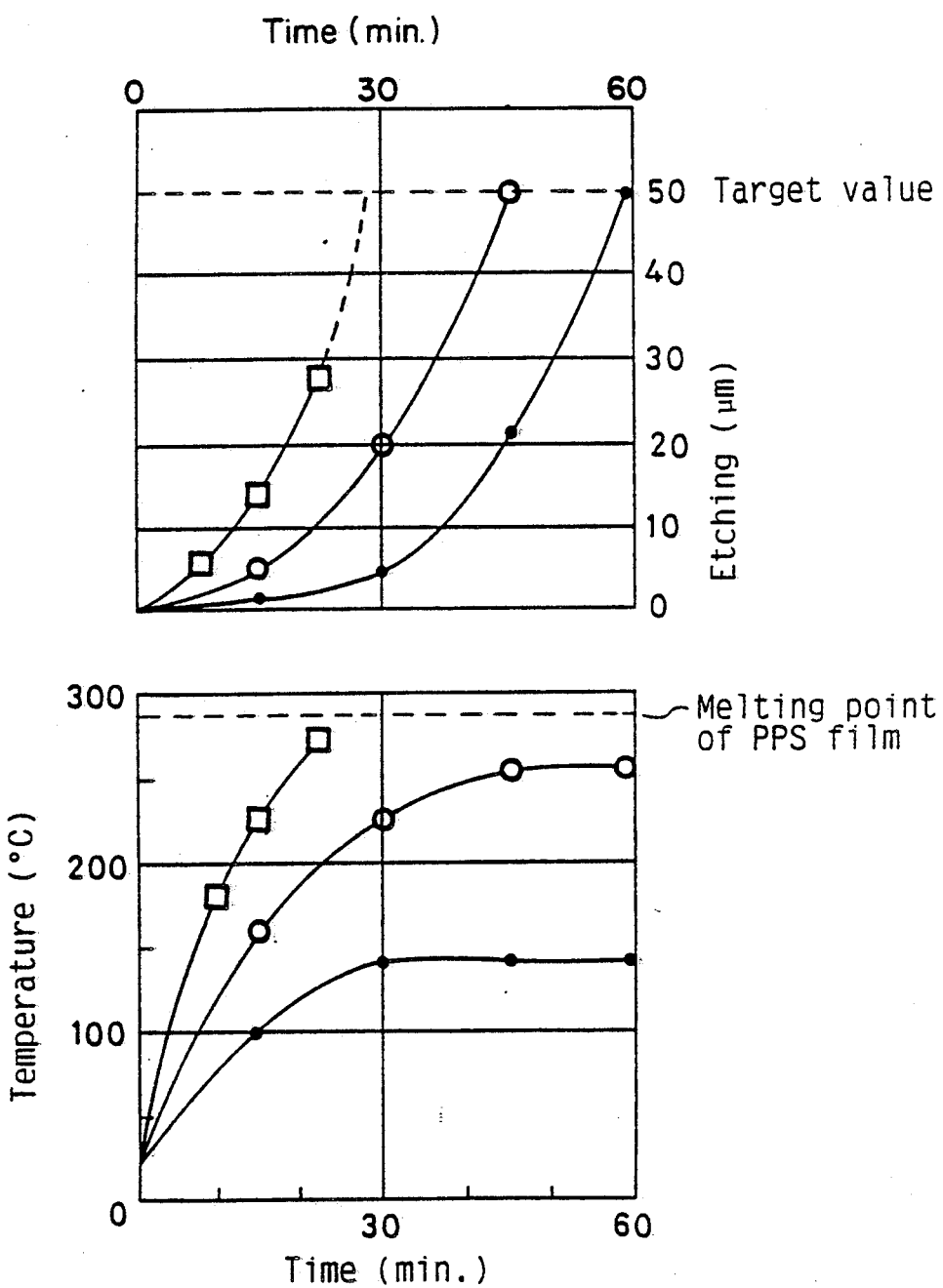
FIG. 2 is a graph of a prior stage non-disclosed art showing relations between processing time (minutes) and amount (depth: μm) of the selective etching of PPS film at the side face, and also temperature rises for several radio frequency powers applied to the chamber.

FIG. 2 is a graph of curves which show relation between processing time (minutes) and amount (depth: $\mu m$) of the selective etching of PPS film at the side face, and also temperature rises for several radio frequency powers applied to the chamber. One example of other processing conditions were as follows:

size of process chamber:
diameter: 300 mm
height: 300 mm
size of PPS laminated capacitor bodies:
width: 3.3 mm
length: 3.8 mm
height (depth): 2.0 mm
   oxygen flow rate: 30 sccm
   pressure in the processing chamber: 0.5 Torr.
   distance between the upper electrode 4 and the lower electrode 5: 50 mm
   radio frequency power: 300 W, 500 W and 700 W
   frequency of the radio frequency power: 13.56 MHz.

In the present invention, the selective etching of side faces of a film capacitor body 1, which comprises a multiple layer lamination, stack or roll of plastic films and electrode layers, is made by contacting the film with excited gas, wherein the first stage processing is made by applying radio frequency power of 700 W for 20 minutes, and the second stage processing is made by application of the radio frequency power of 500 W for 15 minutes.

As mentioned above, the radio frequency power is applied in a two-stage application with different power intensities, wherein in the first stage application of the larger radio frequency power of 700 W, the component which is reactive to the PPS film 1a is generated in oxygen plasma and speed of etching the PPS film 1a is accelerated thereby to shorten the processing time, and the temperature of the film capacitor body 1 is raised in the processing to 270° C. which is close to, but under, the melting temperature of the film capacitor body 1 within the short time of 20 minutes. And in the second stage processing, a smaller intensity of radio frequency power of 500 W is applied so that the temperature of the film capacitor body 1 is controlled to not exceed 285° C. which is the melting temperature of the film capacitor body 1; that is, the process of etching the side face of the film capacitor body 1 is made by keeping the inside and surface temperatures of the film capacitor body 1 at about 270° C. Thus by the two-stage power application, a more efficient processing can be made at a higher temperature region in comparison with the non-disclosed prior stage case where a constant radio frequency power of 500 W is applied. In other words, by heating with the larger radio frequency power of 700 W in the first stage, the side face of the PPS film capacitor body 1 is etched within a shorter time than processing with the constant lower radio frequency power of 500 W in the non-disclosed prior stage single stage processing. As shown in FIG. 1, since the combination of the applications of stronger radio frequency power in the first stage and weaker radio frequency power in the second stage is used, the side face etching of 50 $\mu m$ depth of the PPS film 1a can be made within the total processing time of only 35 minutes wherein the first stage is 20 minutes and the second stage is 15 minutes. This total processing time of 35 minutes is shorter by 10 minutes than 45 minutes of the inventors' non-disclosed prior stage art method made in the same apparatus for the same film capacitor body.

Preferable ratios of the high frequency powers of the second stage are between 30% to 85% of that of the first stage. Under 30% the etching speed is too low, and above 85% the inside of the film capacity body is damaged such as to make voids or short circuit the electrodes.

In the above-mentioned embodiment, the plastic dielectric film was PPS film, but the present invention is applicable to film capacitor bodies using PET (polyethylenetelephthalate) film or PEN (polyethylenenaphthalate) film or PP (polypropylene) film or PC (polycarbonate), or the like, film quite similarly, since these plastic films have fundamentally similar thermal characteristics though their melting temperatures are different.

Figure 4:
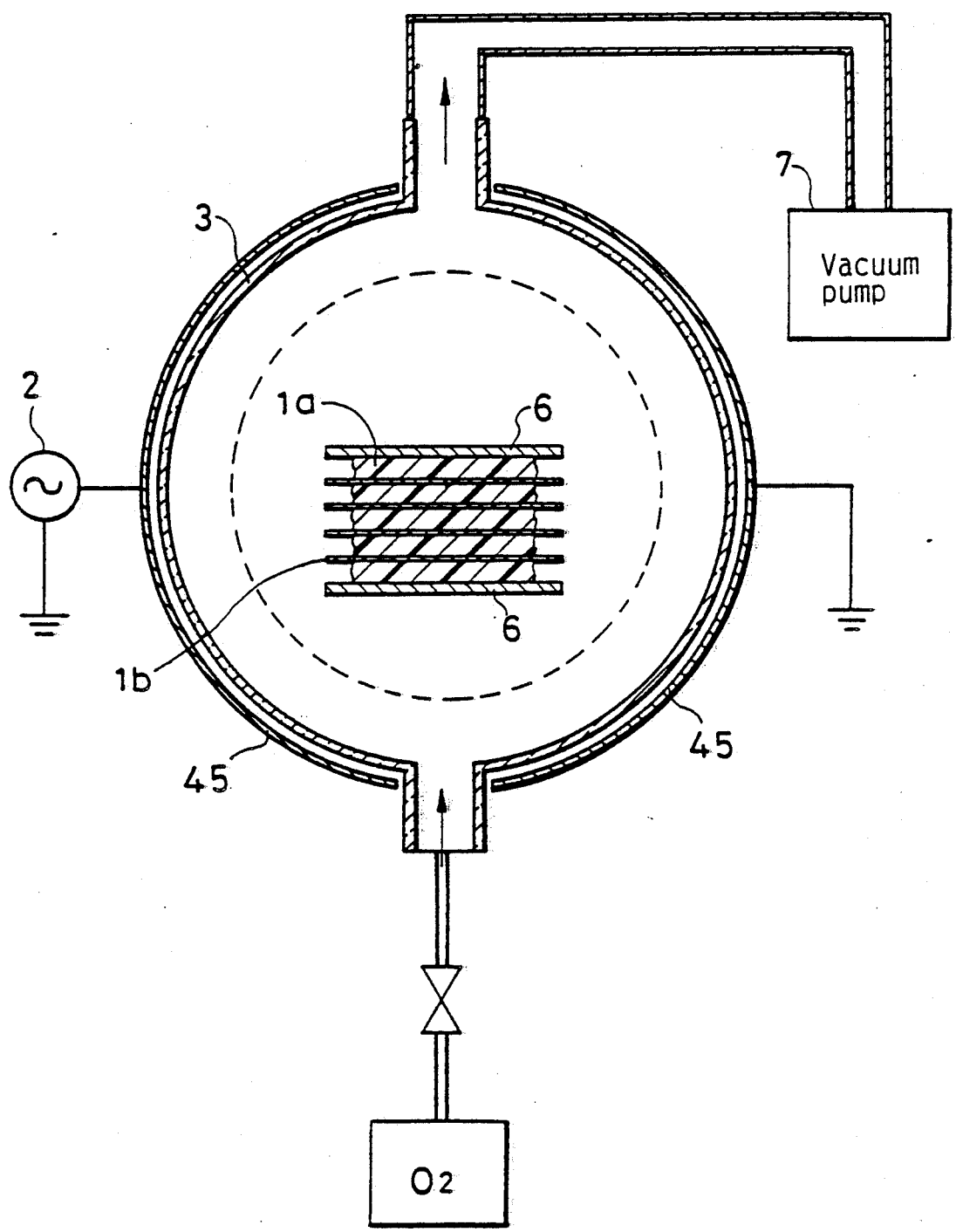
FIG. 4 is a sectional view showing a barrel type manufacturing apparatus to be used for the method of the present invention.

Furthermore, as the processing apparatus, in place of the parallel electrode type plasma etching apparatus as shown in FIG. 3, a barrel type plasma etching apparatus as shown in FIG. 4 wherein a pair of electrodes 45,45 for applying the radio frequency power is provided on outside face of a vacuum thamber 3, can be similarly used in the method of the present invention.

Although the invention has been described in its preferred embodiment with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for manufacturing a film capacitor comprising the steps of:

placing a film capacitor body comprising multiple layers of alternating plastic films and electrodes in a plasma etching chamber; Masking each of an uppermost and lowermost of said layers to leave only side edges exposed;

discharging a plasma host gas in said plasma etching chamber;

selectively etching side edges of said films by contacting said film edges with said host gas to leave exposed protruding edges of said electrode layers said gas being excited to be reactive to selected parts of said plastic films by application of radio frequency power to said plasma etching chamber, said capacitor body being thereby heated by a reaction with said host gas, and;

forming at least one connection member on said exposed protruding edges of said electrode layers to form at least one edge terminal;

said radio frequency power for exciting said reactive gas and heating the film capacitor body being applied to said plasma etching chamber in a two-stage processing which comprises:

a first stage of applying a relatively large radio frequency power for generating sufficient amount of said reactive gas and for raising the temperature of said film capacitor body to a predetermined temperature which is close to but below a melting temperature of said plastic film within a predetermined value, and a second stage, which is subsequent to said first stage, of applying a relatively small radio frequency power for maintaining said film capacitor body around said predetermined temperature, below said melting temperature.

2. A method for manufacturing a film capacitor in accordance with claim 1, wherein
said plasma etching chamber has parallel type electrodes.

3. A method for manufacturing a film capacitor in accordance with claim 1, wherein
said plasma etching chamber has barrel type electrodes.

4. A method for manufacturing a film capacitor in accordance with claim 1, wherein
said radio frequency power of said second stage is about 30–85% of that of said first stage.

* * * * *